(12) United States Patent
Franklin

(10) Patent No.: US 6,213,421 B1
(45) Date of Patent: Apr. 10, 2001

(54) TENSIONING DEVICE

(75) Inventor: Charles R. Franklin, Udine (IT)

(73) Assignee: Contiweiss Weissenfela GmbH & Co. KG, Unna (DE)

( * ) Notice: Subject to any disclaimer, the term of this patent is extended or adjusted under 35 U.S.C. 154(b) by 0 days.

(21) Appl. No.: 09/171,768

(22) PCT Filed: Feb. 23, 1998

(86) PCT No.: PCT/EP98/01027

§ 371 Date: Oct. 26, 1998

§ 102(e) Date: Oct. 26, 1998

(87) PCT Pub. No.: WO98/39168

PCT Pub. Date: Sep. 11, 1998

(30) Foreign Application Priority Data

Mar. 4, 1997 (DE) .............................................. 197 08 756

(51) Int. Cl.[7] .............................. B65H 75/48; B60C 27/10
(52) U.S. Cl. .................................... 242/384.7; 242/385.4; 152/219
(58) Field of Search ............................. 242/384.7, 385.4, 242/396.1, 396.2, 396.3, 396.4; 152/217, 218, 219; 119/796; 254/223, 222

(56) References Cited

U.S. PATENT DOCUMENTS

| | | | |
|---|---|---|---|
| 3,693,596 | * | 9/1972 | Croce et al. ........................ 242/384.7 |
| 3,853,283 | * | 12/1974 | Croce et al. ........................ 242/384.7 |
| 4,188,061 | | 2/1980 | Shehi . |
| 5,377,626 | * | 1/1995 | Kilsby et al. ....................... 242/384.7 |
| 5,400,521 | * | 3/1995 | Waldherr ............................ 242/385.4 |

FOREIGN PATENT DOCUMENTS

| | | |
|---|---|---|
| 3336056 | 4/1985 | (DE) . |
| 3906486 | 2/1991 | (DE) . |
| 4039665 | 6/1992 | (DE) . |
| 2 435 633 | 4/1980 | (FR) . |

* cited by examiner

Primary Examiner—John M. Jillions
(74) Attorney, Agent, or Firm—Reed Smith LLP

(57) ABSTRACT

In a clamping lock for antiskid chains with a housing supporting an actuating lever which has a catch position in which a clamping rope which can be pulled through a housing opening into the housing for purposes of clamping can be locked against its clamping direction and has a release position in which the clamping rope can be released from this locking, the clamping rope is connected inside the housing to a winding device which is pretensioned in the wind-up direction.

22 Claims, 3 Drawing Sheets

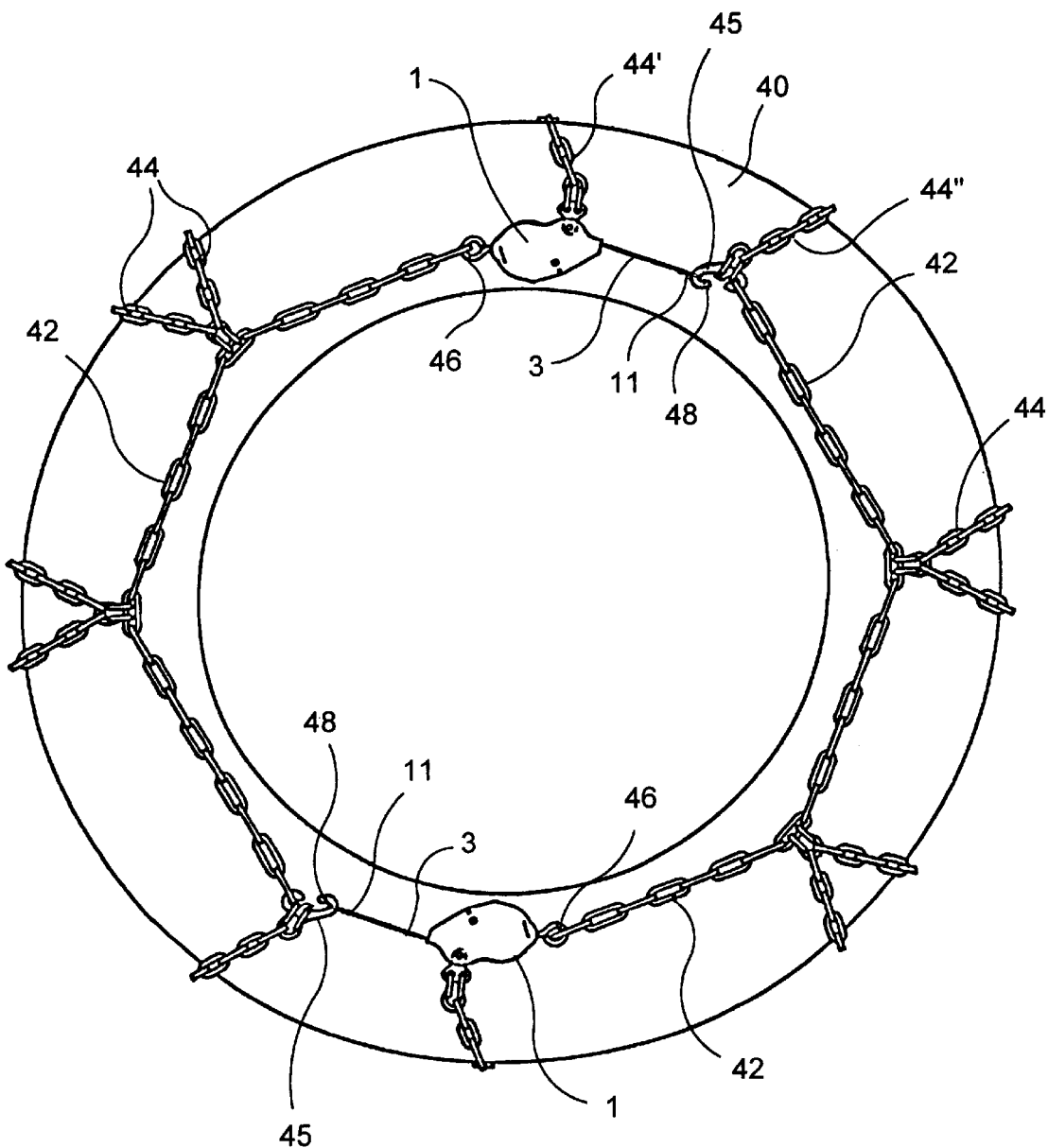
F I G. 6

TENSIONING DEVICE

BACKGROUND OF THE INVENTION a) Field of the Invention

Clamping lock for an antiskid chain with a housing to which is fitted an actuating lever having a catch position in which a clamping rope which can be pulled through a housing opening into the housing for purposes of clamping can be locked against its clamping direction and having a second position in which it can be released from this locking.

b) Description of the Related Art

Such clamping locks are used in antiskid chains in order to prevent the clamping member which can be formed of a length of chain or, e.g., a flexible wire, from running back in an undesirable manner opposite to the clamping direction when clamping the chain netting after mounting and, accordingly, to ensure that the displacements of the clamping rope caused in the pulling or tightening direction cannot be canceled, i.e., to ensure that the clamping rope is held in the clamping position that has been achieved.

In known clamping locks, the clamping rope is guided through the clamping lock and along a deflecting element that is arranged inside the housing of the clamping lock, whereupon it exits again from the housing of the clamping lock and can be grasped by the user in order to exert the desired pulling action. When the chain netting is clamped, the portion of the clamping rope hanging out of the housing on the pull-out side is then suitably hooked into the outer side chain (usually with the intermediary of an elastically stretchable link at the end of the clamping rope) or elsewhere in the chain netting on the side of the chain external to the vehicle.

A clamping lock of this type is known from EP-B-0 385 057. In this case, an actuating lever is provided at the housing and is pretensioned in a catch position by means of a spring and has a catch nose by which it engages in the catch position in a link of the clamping member formed as a length of chain, wherein the latter is locked in position against the clamping direction and is released in a positive-locking manner when the clamping member is moved in the clamping direction due to the special configuration of the catch nose. This enables a movement of the clamping member through the clamping lock in the pulling direction, while an automatic locking is effected opposite to the pulling direction. However, the user can cancel the locking when desired by pressing on the actuating lever and can accordingly make it possible for the clamping member to run freely through the clamping lock, e.g., in order to cancel the clamping of the chain netting when removing the chain.

In another known clamping lock (DE-A-40 39 665) which is likewise constructed in the manner mentioned above, the clamping rope can be introduced into the housing laterally via an insertion slot extending along the entire height of the housing of the clamping lock, which facilitates insertion of the clamping rope into the housing, while the clamping of the chain netting is carried out in the same manner as that of the known clamping lock described above.

In clamping locks of this type, the clamping force must be applied manually to the clamping member by the user who must pull with suitable force in the clamping direction on the end of the clamping rope running out of the housing until achieving the desired clamped position of the chain netting on the wheel. The end of the clamping rope hanging out on the pulling side must then be fastened in a suitable manner on the outside of the chain netting, likewise accompanied by tension, so that a clamped fit is finally achieved overall. In this way, the user can initially achieve a tight fit of the chain while clamping it to the wheel, but when the vehicle is moved, the occurring forces cause the chain to settle on the circumference of the wheel so that the applied tension is reduced and it becomes necessary to tighten the clamping rope again after traveling a certain distance. Only in this way can the chain be prevented from assuming a loose fit on the wheel with all of the consequent disadvantages (such as inadequate effect, loud chain noise during driving, risk of damage to the chain or to other parts of the vehicle by loose chain components) in spite of an initial firm clamping due to the settling movements of the chain itself.

OBJECT AND SUMMARY OF THE INVENTION

On this basis, the primary object of the invention is to propose a clamping lock which considerably facilitates mounting and in which it is even possible to dispense with subsequent repeated clamping of the chain after driving an initial distance.

According to the invention, this object is met in a clamping lock of the type mentioned above in that the clamping rope is connected inside the housing of the clamping lock to a winding device which is pretensioned in the wind-up direction.

In the clamping lock according to the invention, the clamping rope is no longer guided through the housing, as is the case in clamping locks according to the prior art, so that the user may grip it at its other portion running out of the housing for purposes of clamping. Rather, in the invention, the clamping rope is connected within the housing of the clamping lock to a winding device which is pretensioned in the wind-up direction. Since the winding up of the clamping rope acts in the direction in which the clamping rope is pulled into the clamping lock (and accordingly in the clamping direction of the clamping rope), the clamping rope is continuously pretensioned in the clamping direction (wind-up direction) in the clamping lock according to the invention. Accordingly, it is not necessary for the user to pull on one end of the clamping rope to achieve the desired clamping. Rather, it is sufficient that the clamping lock with its housing is fastened at an appropriate location of the chain netting on the outside of the wheel, so that the clamping rope is pulled out of the housing for purposes of mounting (by moving the actuating lever into its second position in which a locking action is no longer exerted on the clamping rope) only until its free end, which is correspondingly provided with a fastening hook or some other fastening device, can be hooked in at another provided location of the chain mesh on the outside of the wheel. When this is carried out, it is only necessary to move the actuating lever into its catch position (which is advantageously carried out in a very simple manner in that the actuating lever is already basically pretensioned in the direction in which it occupies its catch position, so that it always automatically occupies its catch position when it is not pushed into another position manually). In this catch position, the clamping rope is pulled in the clamping direction with a desired pretensioning by the pretensioning action of the wind-up device, so that the desired snug fit of the chain comes about without further effort on the part of the user. When the vehicle is moved subsequently, the clamping rope is always clamped automatically due to the persisting pretensioning in the wind-up direction when the chain netting settles somewhat on the wheel and a relaxation of tension would otherwise occur. This ensures that the clamping rope is always clamped in the desired manner without requiring additional further subsequent clamping and the entire chain netting is accordingly always held in its tightly clamped position on the wheel.

Since, in order to clamp the chain netting, the clamping rope need only be pulled out of the housing until hooking in at the location on the chain netting provided for this purpose, wherein it is subsequently only necessary for the actuating lever to be moved (preferably automatically) into its catch position, the action required for this purpose on the part of the user is very substantially simplified and considerably faster than in known clamping locks in which the subsequent clamping process also requires additional clamping of the clamping rope by the user. The use of the clamping lock according to the invention in an antiskid chain accordingly represents a substantial advance with respect to an especially simple and fast complete mounting of an antiskid chain on the wheel which has been universally desired for a long time.

The winding device inside the housing can be constructed in any suitable form. However, in a particularly preferable manner a winding roll is provided as a winding device. This winding roll can also be adapted particularly easily with respect to its design to the shape and type of clamping rope for the purpose of good guidance when winding up. Accordingly, in a particularly preferable manner, the winding roll is provided with a shaped groove extending around its center axial portion, so that the clamping rope which is wound onto it can be guided axially during winding. The shaped groove is provided with side flanks that are inclined relative to one another in a V-shaped manner in cross section, wherein a certain axial centering of the clamping rope on the winding shaft can also be achieved at the same time when winding up.

However, the winding roll can also advantageously be constructed in such a way that it has a center winding arbor which is bounded laterally by radially projecting flank washers.

In a particularly preferred construction of the invention, the winding device, especially the winding roll, is seated concentric to a pretensioning device, preferably a pretensioning spring. The pretensioning spring is advantageously constructed as a helical spring which is formed in a particularly preferred manner as a helically extending leaf spring. However, in certain cases, it can also be advantageous to construct the pretensioning spring as a torsion spring or as a spiral spring.

A particularly preferred construction of the clamping lock according to the invention consists in that a toothing is provided laterally at the winding device, especially at the winding roll, which toothing can be brought into a locking engagement with a catch member arranged at the actuating lever or controlled by the actuating lever in the catch position of the actuating lever. The tooth shape of the toothing can be selected in any suitable manner that will guarantee the desired blocking against the wind-up direction when engaging with the catch member. On the other hand, the winding roll can rotate in the wind-up direction in that the catch member is lifted out of the catching position for this purpose in a positive-locking manner by a suitable choice of the engagement geometry of the teeth of the locking arrangement in order to allow continued rotation, but always returns to the catching position with the following tooth, wherein it can be lifted out of the catching position again when rotated further in the wind-up direction.

When the winding roll is constructed with a central center arbor which is defined laterally by radially projecting flank washers, the teeth of the toothing are preferably arranged directly at one of the lateral flank washers. However, it can also be equally advantageous to construct the teeth on a toothed wheel which is arranged next to the winding roll coaxial thereto.

It can also be particularly advantageous for certain cases of use when the pretensioning of the winding device is adjustable, but only insofar as the pretensioning does not fall below a minimum value which is required in every case for the application of sufficient pretensioning.

In the clamping lock according to the invention, the actuating lever can preferably also be moved into a third position in which the clamping rope is locked in both of its directions. This position is especially advantageous when, for example, the user has pulled the clamping rope out of the housing but cannot immediately hook it into the counter-receptacle because the user must first move it into a correct hook-in position or the like, for example. In this case, it is advantageous when the user can lock the clamping rope in its pulled out position by means of the actuating lever, so that it is not pulled back again into the housing automatically by the pretensioned wind-up device. In this case, the user can temporarily let go of the pulled out line so as to be able to perform other actions, after which the user hooks in the clamping rope at the desired time and subsequently disengages the actuating lever from its third position and can accordingly switch the clamping rope to automatic clamping of the clamping rope.

Another particularly preferable construction of the clamping lock according to the invention consists in that the actuating lever does not act directly on the wind-up device, but rather cooperates with a catch lever or locking lever which is movable relative to it and which is likewise mounted in the housing so as to be swivelable. This locking lever is provided in turn with a catch member by which it engages with the toothing in the catch position of the actuating lever. The actuating lever can be moved into its three positions by the user from the outside of the housing, wherein the actuating lever, in its catch position, presses the locking lever into a catch engagement with the toothing. This provides, in a simple manner, a three-position adjustment possibility for the actuating lever, while the locking lever which forms the actual catch member need only be moved into two positions (namely into the catch position and into a release position). In this way, it is possible for the actuating lever to be switched into its three different positions by relatively small switching paths through suitable use of kinematics in the relative coordination of the two levers with respect to one another, while the locking lever is specifically constructed only for catching in or disengaging from the associated toothing independently of the switching paths of the actuating lever.

In a particularly preferred manner, the two levers are constructed and arranged in such a way that the actuating lever overlaps the locking lever in the manner of a yoke viewed from the outside of the housing, so that the locking lever is not visible from the outside of the housing and can only be manipulated via the actuating lever, but not in any other way.

When the actuating lever overlaps the locking lever in the manner of a yoke, each of the two levers is preferably supported at the housing by its central area so as to be swivelable about its (own) tilting axis. The distance between the two tilting axes is selected in such a way that the desired kinematics are achieved with respect to the actuation of the actuating lever by the user and with respect to the relative coordination of the two levers with respect to one another.

The locking lever is preferably pretensioned in a suitable manner in the engagement position of its catch member with the toothing, that is, in the catch position.

In a very preferable manner, the actuating lever is provided with two projections provided on both sides of the tilting axis of the actuating lever on its side facing the locking lever, wherein the locking lever is swiveled out of engagement with the toothing in the release position of the actuating lever by means of one of the projections and the locking lever is locked in position in its catch position, in which the catch member engages with the toothing, by means of the other projection in the third position of the actuating lever. This locking ensures that the clamping rope cannot be moved in either of its two directions because the catch member can also no longer be lifted in a positive-locking manner by the toothing into its release position for rotation when pulling in the wind-up direction.

In a particularly preferred manner, the actuating lever is provided with a catch device by means of which it can be (detachably) locked in each of its three adjustment positions with the housing. This facilitates handling by the user because, when swiveling the actuating lever, the user notices without difficulty when one of the three catch positions, and thus one of the three possible adjustment positions, is reached. This is preferably carried out in that the actuating lever is provided with a web or crosspiece at one end on its side facing the locking lever, which crosspiece projects in a curved manner in the swiveling direction into the housing and has recesses which are constructed and arranged in such a way that one of the recesses moves into a detachable locking engagement with a reinforcement or bead which is fixed with respect to the housing when reaching any of the three tilting positions of the actuating lever.

In a particularly preferred construction of the clamping lock according to the invention, a flexible steel cable which is advantageously provided with a plastic sheathing is used as a clamping rope.

The clamping lock according to the invention is therefore distinctly improved with respect to its functionality compared with known clamping locks because an automatic after-clamping is also carried out continuously while driving, wherein virtually the same clamping force acts on the clamping element independent from the stress on the chain, so that an exactly fitting seating of the chain on the vehicle wheel is ensured regardless of the loads acting on the chain. This prevents the chain from loosening its fit in an unwanted manner while driving. One or even two clamping locks according to the invention can be provided at the chain on the outside of the wheel in order to achieve the desired clamping action at one or two clamping locations.

The invention, in principle, is explained more fully hereinafter with reference to the drawing by way of example.

BRIEF DESCRIPTION OF THE DRAWINGS

In the drawings:

FIGS. 3, 4 and 5 show a side view of the clamping lock from FIG. 1, but with the cover removed and with a sectional view of the actuating lever and locking lever, wherein FIG. 3 shows the catch position, FIG. 4 shows the position in which the movement of the clamping rope is completely freed, and FIG. 5 shows the locking position in which the clamping rope is locked in both pulling directions; and FIG. 6 shows a side view of an antiskid tire chain which is mounted on a tire and is outfitted with two clamping locks according to the invention.

DESCRIPTION OF THE PREFERRED EMBODIMENTS

Figure 1:
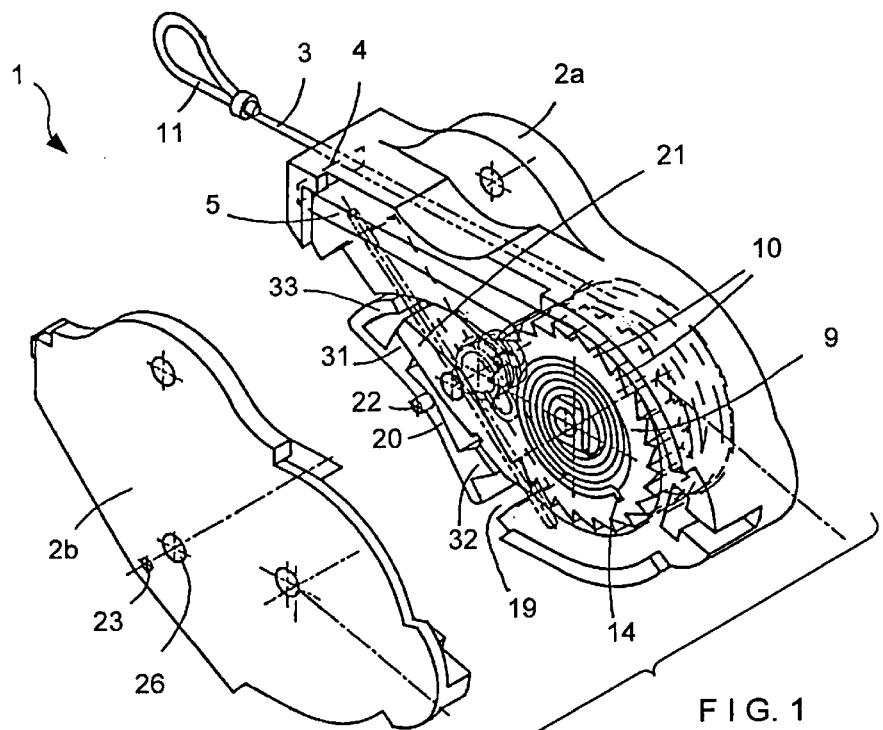
FIG. 1 shows a basic view of a clamping lock according to the invention in perspective, with the housing cover removed.
Figure 2:
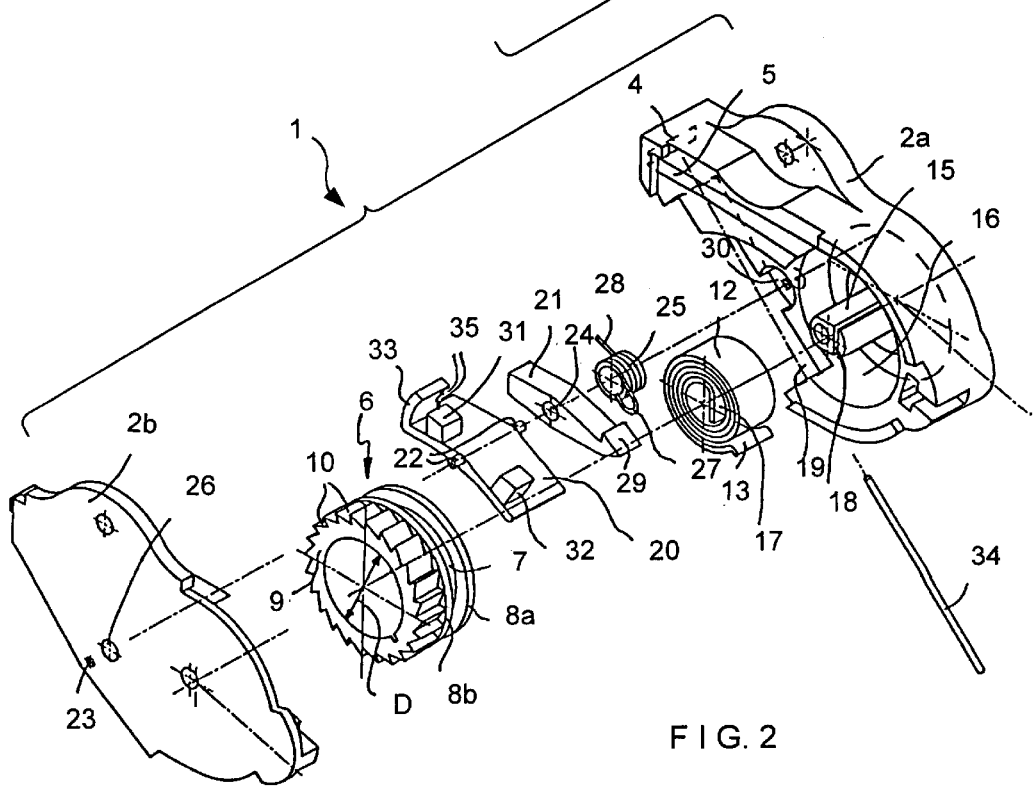
FIG. 2 shows the clamping lock from FIG. 1, but in an exploded view and without clamping rope.

FIGS. 1 and 2 show a clamping lock 1 with a housing comprising two housing parts 2a and 2b, wherein, as can be seen especially clearly from FIG. 1, housing part 2a includes all of the essential moving elements of the clamping lock, while housing part 2b is constructed only as a cover which can be mounted from the side.

FIG. 1 shows an oblique perspective side view of the clamping lock with removed housing cover 2b, while FIG. 2 shows an exploded view of the clamping lock in its entirety.

As can be seen from FIG. 1, a clamping rope 3 runs through an opening 4, not visible and indicated in FIGS. 1 and 2 only by dashes, into and through a guide channel 5 of the housing and is wound up on a winding roll 6 at its end (compare FIG. 2). This winding roll 6 comprises a center winding arbor 7 which is defined laterally by radially projecting flank washers 8a and 8b, wherein the side flanks of the side washers 8a and 8b facing one another are aligned so as to be radially inclined relative to one another, namely in such a way that they diverge outward radially from the center of rotation.

As will be clear from the exploded view in FIG. 2, a toothed ring 9 with a toothing formed of external teeth 10 arranged in a sawtooth-shape is arranged on the axial side of the winding roll 6 which faces the housing cover 25 directly adjacent to the side washer 8b, wherein the connection between the toothed ring 9 and the winding roll 6 can be carried out in any suitable form. Both the toothed ring 9 and the winding roll 6 can be constructed in one piece as a plastic injection molded part, but they may also be separate parts that are fastened together by gluing or, e.g., by a screw.

The clamping rope 3 is provided at its end projecting out of the housing with a loop 11 by which it can be hooked into suitable hooking elements 48 (FIG. 6) at the chain netting in order to clamp the latter.

The winding roll 6 and the toothed ring 9 connected therewith are outfitted with an inner diameter D which is selected to as to be large enough to accommodate within it a pretensioning coil spring 12 which is wound in a spiral and which engages at its outer end, via an angled end portion 13, in a corresponding axial slot 14 at the inner circumference of the part comprising the winding roll 6 and the toothed ring 9, so that the radial outer end of this coil spring 12 is fixed relative to the winding roll 6 and toothed ring 9.

The structural component part comprising the winding roll 6 and toothed ring 9 with the coil spring 12 situated concentrically on the inside sits, in its entirety, on an axle pin 15 of the housing 2a which projects axially from the latter in the direction of the housing part 2b. A receiving opening 16 is formed around the axle pin 15 in the housing part 2a, wherein the arrangement comprising the winding roll 5, toothed ring 9 and coil spring 12 has adequate space within the receiving opening 16 and can be rotated therein without hindrance.

The bent end region 17 of the coil spring 12 located radially inside of the latter is inserted into an axial receiving slot 18 of the axle pin 15 in the installed state, so that the spiral spring 12 is likewise fixed by its inner end 17 by means of its positive engagement with the receiving slot 18 opposite the axle pin 15.

On the lower side wall of the housing of the housing part 2a with reference to the view shown in FIGS. 1 and 2, a recess 19 is provided therein, an actuating lever 20 being arranged in this recess 19 (in the assembled state). In the installed state, the actuating lever 20 engages over a locking lever 21 in the manner of a stirrup or yoke.

The actuating lever 20 has two lateral round projections 22 approximately in its center which engage in a corresponding bearing opening in the side wall of the associated housing part in the installed state, as well as in the bearing opening 23 in the housing part 2b (the corresponding bearing opening in housing part 2a is not visible because of the perspective view in FIGS. 1 and 2).

The locking lever 21 has, in its center portion, an axial opening 24 by which it is supported on a transverse pin (not shown) together with a pretensioning helical spring 25 in the housing parts 2a and 2b, this pretensioning helical spring 25 being arranged on the side remote of the housing cover 2b. The support in the housing cover 2b is carried out by means of a bearing opening 26, while the bearing opening in housing part 2a is again not visible (because of the perspective view). The radial outer end 27 of the helical spring 25 is bent axially by 90° (with an elongated end leg) and is fixedly connected in the installed state with the locking lever 21 in a suitable manner (for example, by insertion into a corresponding lateral slot on the lateral surface of the locking lever 21 facing the helical spring 25, wherein the lateral slot is not visible in the drawing). The helical spring 25 is fixed with respect to the housing in a suitable manner by its other free end region 28 (not shown in detail in the Figure).

Figure 3:
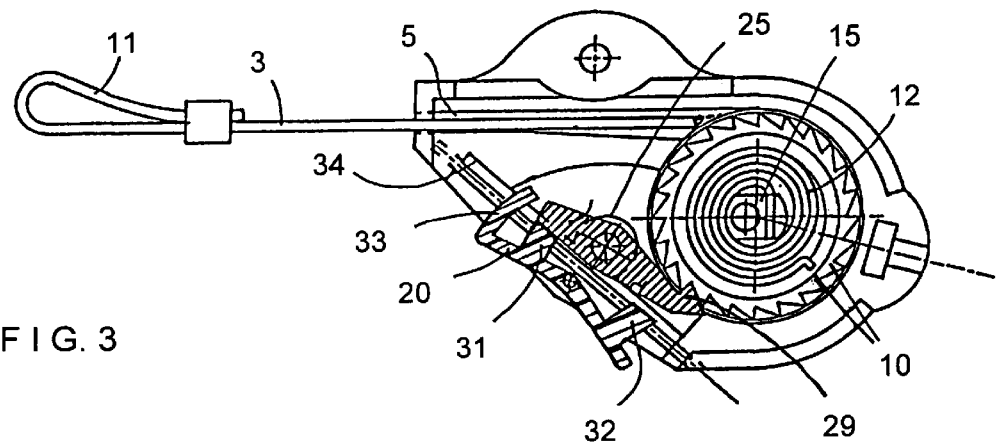
Figure 5:
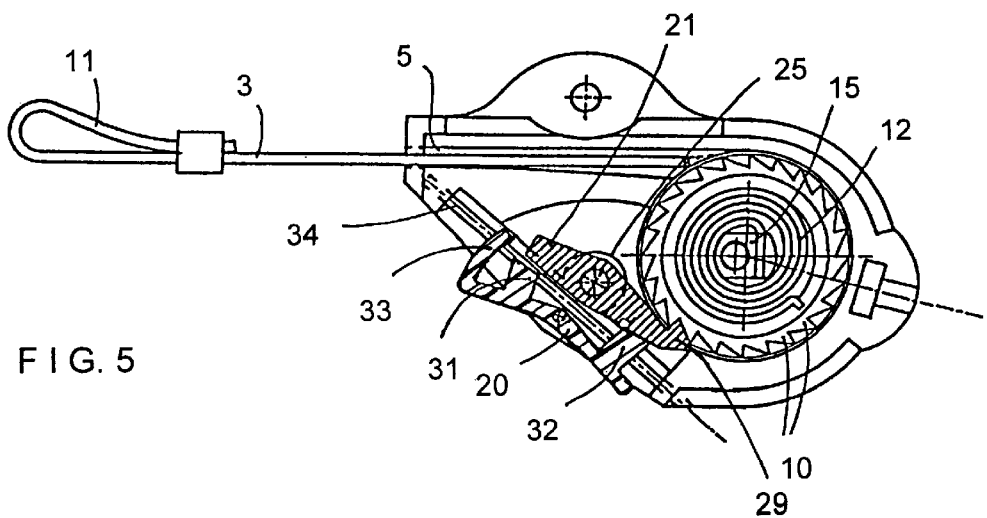

In the installed state, the helical spring 25 is pretensioned in such a way that it presses the locking lever 21 in the direction of its catching engagement with the toothed ring 9. For this purpose, the locking lever 21 has, at the end of its lever arm facing the toothed ring 9, a projecting locking cam 29 which is formed integral thereon and which has a suitable shape to enable it to enter into a locking engagement with the teeth 10 of the toothed ring 9 as is shown in FIGS. 3 and 5.

The helical spring 25 sits in a special cut out 30 which is provided in housing part 2a and in which it is held so as to be swivelable in a suitable manner (for example, by means of an axle pin, not shown, which projects from the side wall of the housing part 2a).

The actuating lever 20 is provided with a projection 31 and 32, respectively, on its underside facing the locking lever 21 on both sides of its tilting axis 22 at a distance therefrom. As will be explained more fully hereinafter, these projections serve to rest against the side of the locking lever 21 facing them, depending on the swiveling position of the actuating lever 20, in order to block certain swiveling directions of this locking lever 21 or even to press the latter in a certain position.

At one end, the actuating lever 20 has a crosspiece 33 which projects in a curved manner in the swiveling direction into the housing and is provided, on its side remote of the housing cover 2b, with different recesses 35 which, in the installed state, enable the crosspiece 33 to enter into a locking engagement with a bead which is arranged in the housing so as to be fixed with respect to the housing (this bead is shown in FIGS. 1 and 2 as a small metal rod 34 arranged in the housing), specifically in such a way that it engages with the bead 34 in a locking manner in each of the three adjustment positions of the actuating lever 20.

In the view shown in FIG. 1, the projection 31 of the actuating lever 20 contacts the surface of the locking lever 21 facing it, wherein the locking cam 29 of the locking lever 21 engages in a locking manner in the toothing 10 at the same time. Thus, in the position according to FIG. 1, the actuating lever is in its rest position, as it is called, in which it is pretensioned by the helical spring 25.

This catch position is shown again more clearly in FIG. 3, wherein the actuating lever 20 and the locking lever 21 are indicated in sectional view for the sake of better clarity. In this first, so-called rest position, as can be seen, the actuating lever 21 is tilted in such a way that its projection 31 rests against the surface of the locking lever 21 facing it, while the latter engages in the toothing 10 in a locking manner at its opposite end by the locking member 29. In this position, the second projection 32 at the actuating lever 20 is located at a distance from the surface of the locking lever 21 facing it. The magnitude of this distance is such that when the toothing is rotated in the wind-up direction of the clamping rope 3 (that is, in the clockwise direction as viewed in the drawing) the actuating lever 21, which is pretensioned in this catch position by the action of the helical spring 25, can be swiveled out of its catch position (likewise in the clockwise direction) by positive engagement, so that the following tooth of the toothing 10 can pass through under it, whereupon the locking lever 21 snaps back into the catch position from which it is guided out again by continued rotation in the wind-up direction, and so on.

Figure 4:
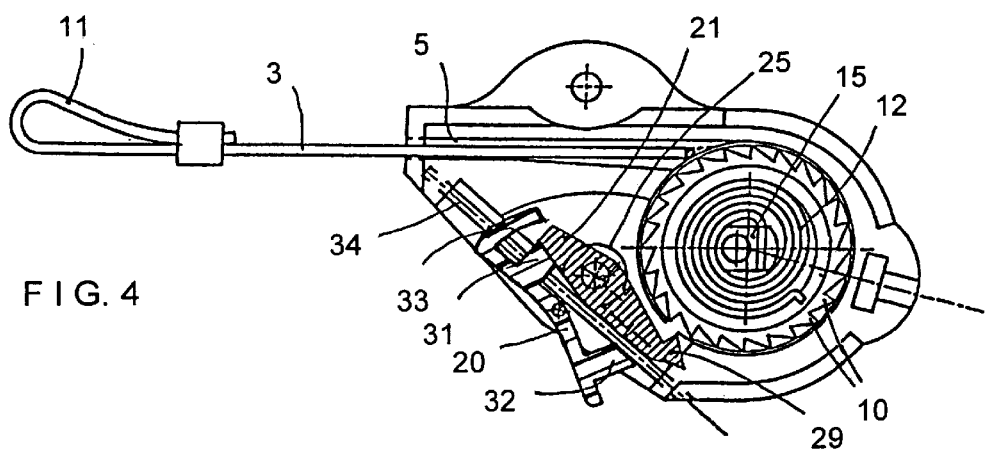

FIG. 4 shows the position of the clamping lock 1 in which the clamping rope 3 can be moved in a completely free manner in both of its movement directions. In this second, so-called release position shown in the drawing, the actuating lever is folded in somewhat further in the clockwise direction than in the view in FIG. 3, so that as a result of the contact of the projection 31 on the lateral surface of the locking lever 21 facing it, this locking lever 21 is tilted out of its locking position with the toothing 10 as is shown in FIG. 4. The toothing 10 (and the wind-up roll 6 connected therewith) is accordingly free to rotate in both rotating directions, so that in this position the user is able to pull the clamping member 3 out of the housing as far as desired by the user. However, in this position, the locking lever 21 is pretensioned by the action of the pretensioning spring 25 in the direction of the catch position shown in FIG. 3. However, due to the locking of the actuating lever 20 via its lateral recesses 31 at the bead 34 which is fixed with respect to the housing, the actuating lever 20 is held in a locked manner in each of its three settings, so that the user can also let go of the actuating lever 20 in its release position without the locking lever 21 automatically returning to its catch position under the influence of the pretensioning spring 25. In order to cause this, the user must first release the actuating lever 20 from the release position, whereupon the actuating spring 25 can then cause the locking lever 21 to be pressed into its catch position.

Finally, FIG. 5 shows the third adjustment possibility of the actuating lever 20 in which the latter is pressed into the housing most firmly in the counterclockwise direction. In this position, the other projection 32 of the actuating lever 20 now contacts the surface of the locking lever 21 facing it, so that the catch position now occupied by the locking lever 21 is locked by a positive engagement. In this blocking position, it is no longer possible to lift the locking lever 20 out of its catch position by the oblique tooth flanks in order to allow the latter to pass under the locking lever 21, even when the toothing 10 is rotated in the wind-up direction (that is, in the clockwise direction as viewed in the drawing). Rather, the catch member 29 of the locking lever 21 remains in locking engagement with the toothing 10, so that the rotation of the winding roll 6 is completely blocked. In this position, it is not possible either to pull the clamping rope 3 out of the housing or to pull the clamping rope 3 into the housing by means of the wind-up device.

During assembly, the rope in the clamping lock 1 shown in the drawing is released by pressing the lever 20 into the release position shown in FIG. 4 so that it can be pulled out until the fastening loop 11 is hooked in at an appropriate fastening location 48 (FIG. 6). Subsequently, the lever 20 is tilted by the user into its center position (catch position) in which the clamping rope 3 is acted upon by the pretensioning of the spring 12, while it is locked in the opposite direction. In this position, the clamping rope 3 is pulled into the housing 2 as far as possible under the pressure of the pretensioning spring 12. If the chain tension relaxes during subsequent travel of the vehicle, the clamping rope 3 is re-tightened in the wind-up direction under the continuing influence of the pretensioning of the clamping spring 12.

This enables a very simple and fast mounting of the chain without the need to stop the vehicle again after starting in order to re-tighten.

The clamping lock according to the invention also offers the advantage that it allows chains that are provided with the clamping lock to be adapted to tires with greater facility, also with regard to the different dimensions of the tires. For instance, this clamping lock can be mounted on snow chains with a normal inner chain in the form of a series of chain rings, as well as on snow chains whose inner chain has a flexible yoke. It is also possible to use the clamping lock for snow chains whose inner chain is made from metal cable or on snow chains in the form of assembled elements. The clamping lock can also be used for chains for trucks, utility vehicles or other types of vehicle.

The housing of the clamping lock 1 can be produced from any suitable material, e.g., sheet steel, but is preferably made from a suitable plastic as an injection molded part, which also enables the arrangement of more complicated inner shapes of the housing in one piece. The winding roll 6 and the toothing 10, as well as the different levers 20, 21, can likewise be produced from suitable plastic; however, it is also possible to produce the winding roll 6 and toothing 10 from metal.

FIG. 6 shows a snow chain which is outfitted with the clamping locks 1 shown in FIGS. 1 to 5 and is mounted on a tire 40, wherein FIG. 6 shows a view of the mounted snow chain from the outside of the tire.

The chain has an outer holder length 42 on the outer side and a side length (not visible in the drawing) on the inner side of the wheel as a side holder, wherein, however, the latter is constructed in the form of a circumferentially extending flexible steel wire yoke whose ends are hooked together via a conventional hook closure. The inner slide holder and the outer side length 42 are connected with one another by chain lengths 44 which are guided over the tire tread as is shown in FIG. 6.

As is shown in FIG. 6, the outer side chain comprises two chain portions 42, each of which is connected at one end via a connecting link 45 with a chain portion 44" extending over the tread of the tire 40. This connecting link 45 is provided with a projecting hook 48 in which the loop 11 of a clamping member 3 is hooked, wherein this clamping member 3 runs out of a clamping lock 1 of the type shown in FIGS. 1 to 5 and is subjected to a wind-up pretensioning in this clamping lock 1. The clamping lock 1 is connected in turn, via an eyelet 46, with the second end of one of the two lateral holder lengths 42 and is additionally fastened in an articulated manner at a transverse chain 44" extending over the tread of the tire 40 as can be seen in FIG. 6.

In this way, the two length portions 42 of the outer side length of the antiskid chain are connected with one another at both ends by clamping locks 1 and by the clamping ropes 3 which are pulled out of these clamping locks 1 and are subject to wind-up pretensioning. Due to the pretensioning acting on each clamping rope 3 in the wind-up direction, the hooks 48 at the opposite end of the other chain length portion are pulled toward the associated clamping lock 1 accompanied by a predetermined pulling tension, so that the entire chain netting is clamped and held tight in its position.

As a result of the arrangement of two clamping locks 1 shown in the drawing, the antiskid chain can be opened on its front side for the purpose of mounting or removal in such a way that the two chain length portions 42 of the outer side chain can be guided independent from one another with the transverse chains 44 and 44' or 44" fastened to them without being impeded by the respective portion of tread of the tire 40. For this purpose, it is necessary only to unhook the loops 11 from the associated fastening hooks 48 (for removal) or, after initial mounting, to hook them in and then apply pretensioning to the clamping rope 3 by adjusting the actuating lever in its catch position.

The chain construction shown in the drawing enables a quick and simple mounting and removal of the snow chain. When mounting the snow chain, the inner side holder is first slipped over the tire tread (on the side of the tire 40 not shown in FIG. 6) and its free ends are then connected with one another via the closure arranged thereon. The two lateral length portions 42 of the outer side chain which are separate from one another can then be guided forward over the tire surface, whereupon the user actuates both clamping locks 1 by guiding the actuating lever into the release position in which the user can pull the clamping rope 3 out of the clamping lock 1 far enough that the loop 11 can be hooked into the associated hook 48, whereupon the actuating lever is guided back into its catch position and the desired pretensioning is subsequently exerted on the clamping member 3. If this is carried out with both clamping locks 1, the chain tightens by itself and also automatically while driving.

In order to remove the chain shown in the drawing, the actuating lever 20 in each clamping lock 1 is initially moved into its release position again and the clamping rope 3 is pulled out of the clamping lock 1 until the loop 11 can be unhooked from the counter-hook 48 in a simple manner. Accordingly, it is possible for the user to move, e.g., the actuating lever of each clamping lock 1 into its locking position in which the clamping rope 3 is completely locked in the pulled out location, so that it can also not run back into the housing of the clamping lock 1 in an unwanted manner. However, by means of a suitable construction of the loop 11 or by arranging an additional stop element behind the loop 11 it can be ensured in every case that it is impossible for the loop 11 to run into the housing of the clamping lock 1 in an unwanted manner even when the clamping member 3 is acted upon by pretensioning after unhooking the loop 11.

While the foregoing description and drawings represent the present invention, it will be obvious to those skilled in the art that various changes may be made therein without departing from the true spirit and scope of the present invention.

What is claimed is:

1. A clamping lock for an antiskid chain comprising:
   a housing having a housing opening;
   an actuating lever which is fitted to said housing having a catch position in which a clamping rope which can be pulled through said housing opening into the housing for purposes of clamping can be locked against its clamping direction,
   said actuating lever having a release position in which the clamping rope can be released from said locking;
   a winding device; and
   said clamping rope being connected inside the housing to said winding device which is pretensioned in the wind-up direction;
   the actuating lever being able to also be moved into a third position in which it locks the clamping rope in both of its directions;
   a toothing being arranged laterally at the winding roll and which can be brought into a locking engagement with a catch member arranged at the actuating lever or controlled by the actuating lever in the catch position of the actuating lever, the actuating lever cooperating with a locking lever which is movable relative to it, both levers being mounted at the housing so as to be swivelable, and the locking lever being provided with the catch member by which it can be brought into engagement with the toothing in a catch position, while the actuating lever can be moved into its three positions by the user from the outside of the housing;
   the locking lever being pretensioned in the engagement position of its catch member with the toothing,
   the actuating lever having two projections provided on both sides of a tilting axis on the side of the actuating lever facing the locking lever, the locking lever being swiveled out of engagement with the toothing in the release position of the actuating lever by means of one of the projections and the locking lever can be locked in position in its catch position, in which the catch member engages with the toothing, by means of the other projection in the third position of the actuating lever.

2. The clamping lock according to claim 1 wherein the winding device is a winding roll.

3. The clamping lock according to claim 2 wherein the winding roll is seated concentrically on a pretensioning spring.

4. The clamping lock according to claim 3, wherein the pretensioning spring is a helical spring.

5. The clamping lock according to claim 4, wherein the helical spring is constructed as a helically extending leaf spring.

6. The clamping lock according to claim 3, wherein the pretensioning spring is a torsion spring.

7. The clamping lock according to claim 3, wherein the pretensioning spring is constructed as a wound spring or spiral spring.

8. The clamping lock according to claim 2, wherein a toothing is arranged laterally at the winding roll and can be brought into a locking engagement with a catch member arranged at the actuating lever or controlled by the actuating lever in the catch position of the actuating lever.

9. The clamping lock according to claim 8, wherein the teeth of the toothing are constructed in a sawtooth manner.

10. The clamping lock according to claim 8, wherein the winding roll has a center arbor which is defined laterally by radially projecting flank washers.

11. The clamping lock according to claim 10, wherein the teeth of the toothing are arranged directly at one of the lateral flank washers.

12. The clamping lock according to claim 10, wherein the teeth are constructed on a toothed wheel which is arranged next to the winding roll coaxial thereto.

13. The clamping lock according to claim 1, wherein the winding roll is provided with a shaped groove extending around its center axial portion for axial guidance of the clamping rope which is wound onto it.

14. The clamping lock according to claim 13, wherein the shaped groove is provided with side flanks that are inclined relative to one another in a V-shaped manner in cross section.

15. The clamping lock according to claim 1, wherein the pretensioning of the winding device is adjustable.

16. The clamping lock according to claim 1, wherein the actuating lever overlaps the locking lever in the manner of a yoke viewed from the outside of the housing.

17. The clamping lock according to claim 16, wherein the two levers are supported at the housing by their central area so as to be swivelable about a tilting axis.

18. The clamping lock according to claim 1, wherein the clamping rope is a flexible steel cable which is preferably sheathed with plastic.

19. The clamping lock according to claim 18 wherein the flexible steel cable is sheathed with plastic.

20. The clamping lock according to claim 1 in combination with an antiskid tire chain adapted to be mounted on a tire.

21. The combination of claim 20, wherein said clamping lock is coupled to a first portion of said antiskid tire chain; said combination further comprising a second clamping lock coupled to a second portion of said antiskid tire chain.

22. A clamping lock for an antiskid chain comprising:
    a housing having a housing opening;
    an actuating lever which is fitted to said housing having a catch position in which a clamping rope which can be pulled through said housing opening into the housing for purposes of clamping can be locked against its clamping direction;
    said actuating lever having a release position in which the clamping rope can be released from said locking;
    a winding device; and
    said clamping rope being connected inside the housing to said winding device which is pretensioned in the wind-up direction;
    the actuating lever being able to also be moved into a third position in which it locks the clamping rope in both of its directions,
    a toothing being arranged laterally at the winding roll and which can be brought into a locking engagement with a catch member arranged at the actuating lever or controlled by the actuating lever in the catch position of the actuating lever, the actuating lever cooperating with a locking lever which is movable relative to it, both levers being mounted at the housing so as to be swivelable, and the locking lever being provided with the catch member by which it can be brought into engagement with the toothing in a catch position, while the actuating lever can be moved into its three positions by the user from the outside of the housing;
    the actuating lever having a catch device by means of which it can be locked in each of its adjustment positions with the housing;
    the catch device having a crosspiece arranged at one end of the actuating lever, which crosspiece projects in a curved manner in the swiveling direction into the housing and is provided with recesses, each of which moves into a detachable locking engagement with a bead which is fixed with respect to the housing when reaching a predetermined tilting position of the actuating lever.

* * * * *